United States Patent

Fowler

[15] 3,674,309
[45] July 4, 1972

[54] VEHICLE SEAT LATCH

[72] Inventor: Stanley B. Fowler, Flint, Mich.
[73] Assignee: General Motors Corporation, Detroit, Mich.
[22] Filed: Oct. 30, 1970
[21] Appl. No.: 85,381

[52] U.S. Cl............................................................297/379
[51] Int. Cl................................................A47c 3/00
[58] Field of Search..................297/379, 216, 378, 377, 366, 297/370, 216; 296/65

[56] References Cited

UNITED STATES PATENTS

| | | | |
|---|---|---|---|
| 2,737,229 | 3/1956 | Semar | 297/379 |
| 3,028,198 | 4/1962 | Murr | 297/216 |
| 3,123,401 | 3/1964 | Komenda | 297/379 |
| 3,262,725 | 7/1966 | Ballantyne | 297/379 X |
| 3,433,524 | 3/1969 | Close | 296/65 |
| 3,549,202 | 5/1969 | Boschen et al | 297/379 |

*Primary Examiner*—Bobby R. Gay
*Assistant Examiner*—Glenn O. Finch
*Attorney*—W. E. Finken and D. L. Ellis

[57] ABSTRACT

A latch for a vehicle seat structure having a cushion base member and a tiltable cushion back member, the latch including a striker rigidly mounted on the cushion base member, a bifurcated latch bolt pivotally mounted on the cushion back member, fixed abutment means on the cushion back member, and an inertially responsive detent lever pivotally supported on the latch bolt. When normal conditions prevail, the detent lever bypasses the abutment means to permit free movement of the latch bolt and the cushion back member. When abnormal conditions prevail, as when rapid deceleration of the vehicle induces inertially motivated tilting of the cushion back member, the detent lever engages the abutment means to retain the latch bolt in a latching position wherein the latter captures the striker to prevent tilting movement of the cushion back member.

2 Claims, 6 Drawing Figures

PATENTED JUL 4 1972

INVENTOR.
Stanley B. Fowler
BY
D. L. Ellis
ATTORNEY

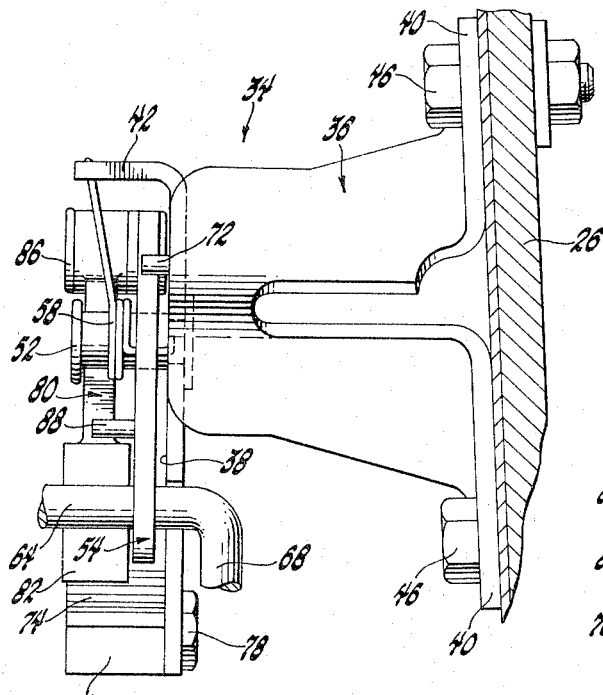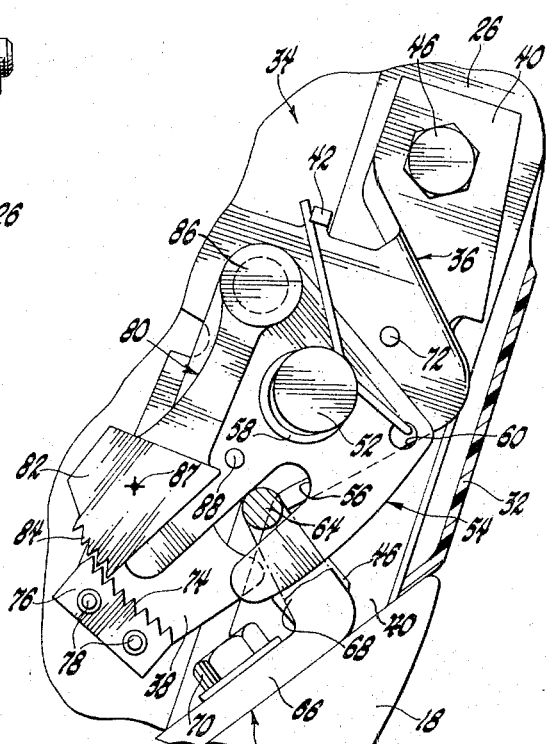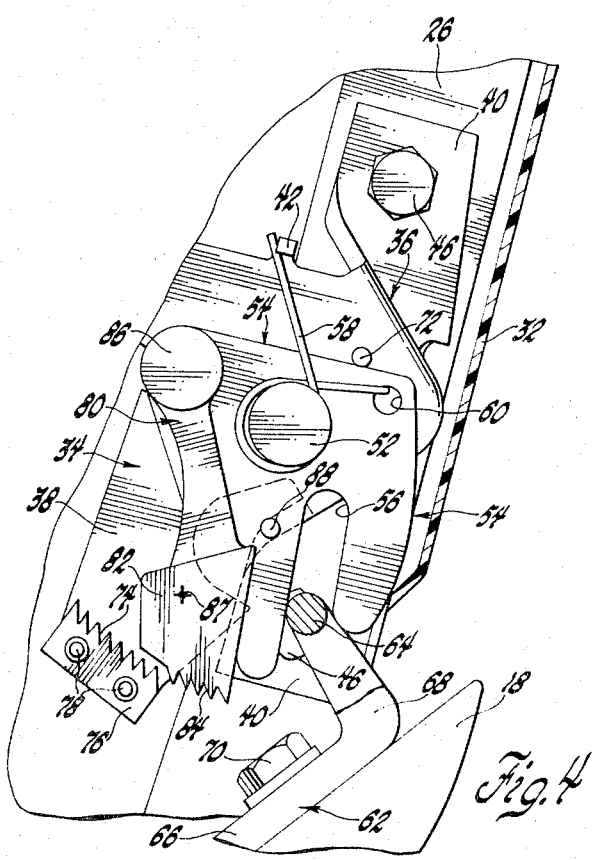

VEHICLE SEAT LATCH

This invention relates generally to latches and in particular to a latch for maintaining a tiltable cushion back number of a vehicle seat structure in an upright position under conditions inducing inertially motivated tilting movement thereof.

In many types of automotive vehicles it has long been the practice to provide seat structures including a stationary cushion base member and a cushion back member mounted on the base member for pivotal movement from a normal upright position to a forwardly tilted position, the pivotal movement of the cushion back member facilitating passenger movement to and from a space behind the seat structure. Such seat structures commonly incorporate latches which maintain the cushion back member in the upright position under conditions inducing inertially motivated pivotal or tilting movement, as during emergency braking of the vehicle. Typical prior art latches intended for such use incorporate operating means in the form of levers or push buttons which must be actuated by a passenger to effect normal pivotal movement of the seat back. Still other latch arrangements incorporate inertially activated hooks on one of the cushion base member and cushion back member which swing into engagement with a cooperating projection on the other member to prevent rapid tilting of the cushion back member. As an alternative to the hook type latch designs, a latch according to this invention incorporates, first, a latch bolt which assumes a latching position capturing a striker whenever the cushion back member is in the upright position and, second, inertially activated detent means which normally remain inoperative but which function to maintain the latch bolt in the latching position under conditions inducing inertially motivated movement of the cushion back member.

The primary feature of this invention is that it provides an improved latch for a cushion back member of a vehicle seat structure, the latch including latch bolt means on one of the cushion back member and the cushion base member engageable on a striker means on the other and an inertially responsive detent means operable to maintain the latch bolt means in a latching position under conditions inducing intertially motivated tilting of the cushion back member. Another feature of the invention resides in the provision of a bifurcated latch bolt pivotally supported on one of the cushion base member and the cushion back member and operable to capture a striker on the other in the upright position of the cushion back member, the latch bolt pivotally supporting an inertially sensitive detent lever which normally remains remote from fixed abutment means but which is engageable on the latter under conditions inducing inertially motivated tilting of the cushion back member to prevent movement of the latch bolt and thereby maintain the cushion back member in the upright position. A still further feature of this invention resides in the provision of control means on the latch bolt operable to vary the sensitivity of the latch to deceleration of the vehicle which induces inertially motivated tilting of the cushion back member out of the upright position.

These and other features of this invention will be readily apparent from the following specification and from the drawings wherein:

FIG. 3 is a view taken generally along the plane indicated by lines 3—3 in FIG. 2;

FIG. 4 is a view similar to FIG. 2 but showing the detent lever in engagement with the abutment means to prevent movement of the latch bolt;

FIG. 5 is similar to FIG. 2 but showing the latch bolt in an unlatching position corresponding to the forwardly tilted position of the seat back member; and FIG. 6 is a perspective view of the latch according to this invention.

Figure 1:
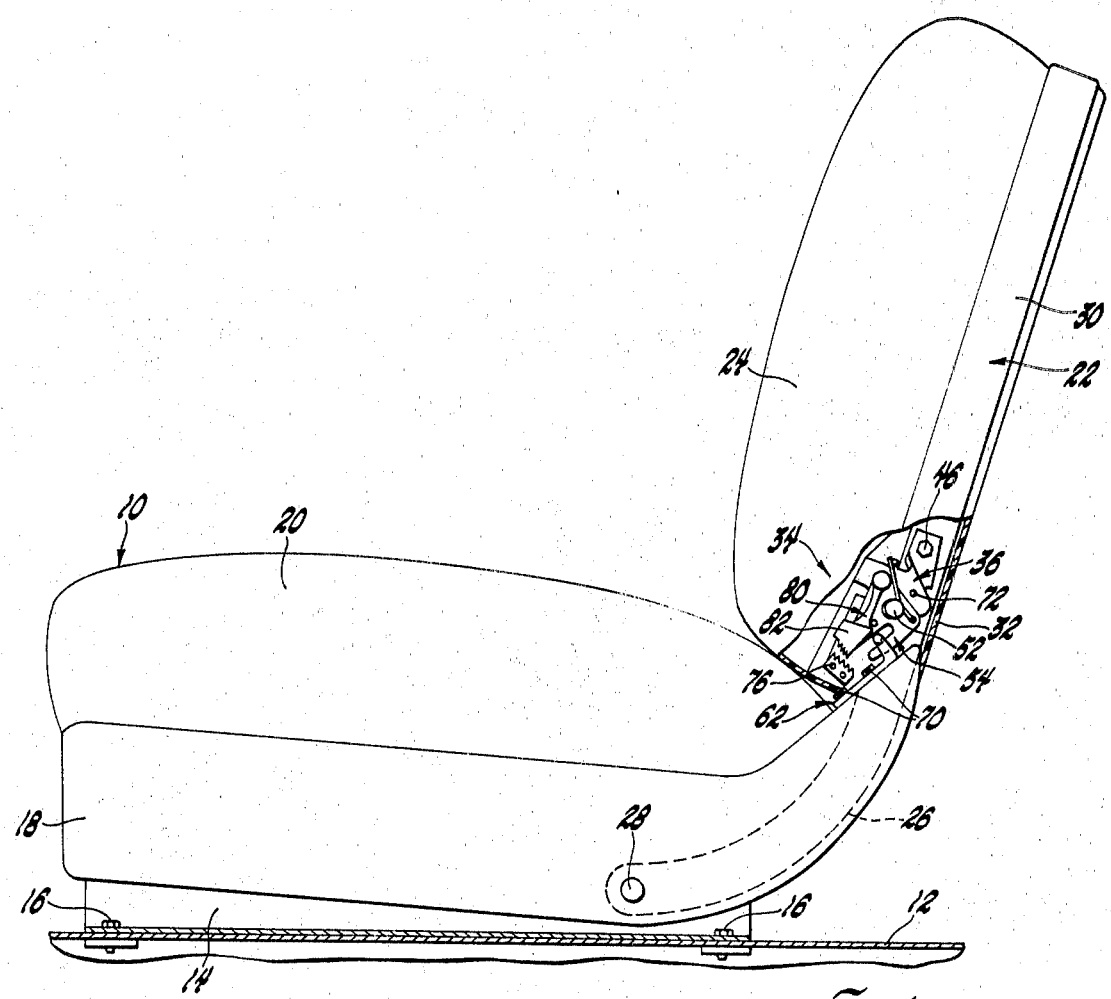
FIG. 1 is a partially broken away side elevational view of a vehicle seat structure incorporating a latch according to this invention.

Referring now to FIG. 1 of the drawings, there is shown a vehicle seat structure designated generally 10 adapted for adjustable mounting on a floor panel 12 of the vehicle, not shown, through a seat adjusting device 14 of conventional design rigidly secured to the floor panel 12 by a plurality of bolts 16. The seat structure 10 includes a cushion base member 18 supporting a cushion 20 and a cushion back member 22 supporting a cushion 24. The cushion back member 22 includes a pair of laterally spaced vertical arms interconnected by conventional bracing means, not shown, only left vertical arm 26 being shown in FIGS. 1 through 5. The vertical arms are pivotally supported on opposite sides of the cushion base member 18, only pivot 28 between the cushion base member and the left vertical arm 26 being shown in FIG. 1, to thereby support the cushion back member 22 and cushion 24 on the cushion base member 18 for pivotal or tilting movement between a normal upright position, FIG. 1, and a tilted position, not shown, rotated counterclockwise from the upright position. The cushion back member includes a decorative side panel 30 and a back panel 32, the decorative panels concealing conventional bracing within the cushion back member. Situated generally within the cushion back member and concealed by the panels 30 and 32 is a latch according to this invention and designated generally 34.

Figure 2:
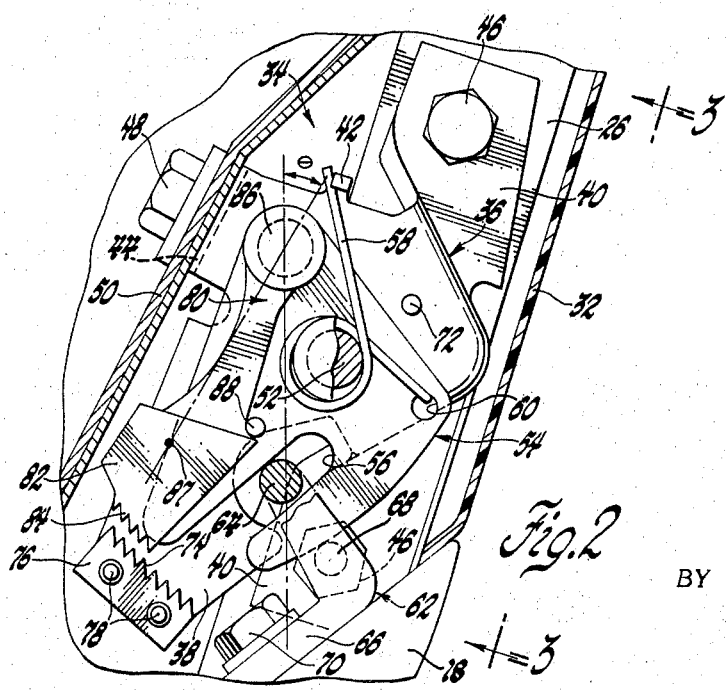
FIG. 2 is an enlarged view of a portion of FIG. 1 showing the latch bolt in a latching position and the detent lever remote from the abutment means and ineffective to prevent movement of the latch bolt.

As best seen in FIGS. 1, 2 and 3, the latch 34 includes a main support member 36 having a flat face 38 and a pair of flanges 40 spaced from the flat face and extending generally parallel thereto. An up-turned tab 42 and a downturned tab 44, each integral with the main support member, extend in opposite directions and generally perpendicularly to the flat face 38. The main support member 36 is rigidly secured to left vertical arm 26 of the cushion back member 22 by bolts 46 and is additionally rigidified by a bolt 48, FIG. 2, securing downturned tab 44 to a secondary brace member 50 of the cushion back member. The main support member 36 is thus pivotable as a unit with the cushion back member 22 and with cushion 24 relative to the cushion 20 and cushion base member 18.

As best seen in FIGS. 2, 3 and 6, a rivet 52 is rigidly secured to the main support member 36 and projects generally perpendicularly to the flat face 38. The rivet 52 rotatably supports a bifurcated latch bolt 54 having a throat portion 56. The rivet 52 further supports a coil torsion spring 58 one leg of which abuts up-turned tab 42 on the main support member and the other leg of which is anchored on the bifurcated latch bolt 54 in an aperture 60 in the latter, the spring 58 thus functioning to bias the latch bolt 54 in a counterclockwise direction, FIGS. 2, 4 and 5.

A striker means 62 is provided on the cushion base member 18 and includes a cross bar striker 64 attached to a pair of mounting flanges 66 by a pair of integral supporting arms 68. The mounting flanges 66 are rigidly attached to the cushion base member 18 by a plurality of bolts 70 so that the cross bar striker 64 lies generally perpendicular to and intersects the plane of bifurcated latch bolt 54, FIG. 3.

As seen best in FIG. 4, the torsion spring 58 biases the latch bolt 54 counterclockwise toward an unlatching position in the tilted position of the cushion back member 22, the unlatching position being defined by engagement between an edge of the latch bolt and a stop pin 72 rigidly affixed to main support member 36 and projecting perpendicularly to flat face 38. The unlatching position of the latch bolt is predetermined such that the throat portion 56 is oriented in position to envelop cross bar striker 64 as the cushion back member pivots counterclockwise, FIG. 1, relative to the cushion base member 18 toward the upright position. Subsequent to initial engagement between the cross bar striker an the latch bolt the cross bar striker initiates counterclockwise pivotal movement of the latch bolt relative to the rivet 52 from the unlatching position to a latching position FIG. 2, when the cushion back member 22 achieves the upright position. When normal operating conditions prevail, the cushion back member 22, being angled slightly rearward in the upright position, remains in the upright position under its own weight so that the latch bolt 54 is held by the cross bar striker 64 in the latching position against the bias of torsion spring 58. The latch bolt 54 normally freely idles between the latching and unlatching positions in response to pivotal movement of the cushion back member 22 and cushion 24 between the upright and the tilted positions.

Referring now to FIGS. 3 and 6, inertially responsive detent means are provided between the latch bolt and the cushion back member 22 to maintain the latch bolt in the latching position under predetermined conditions and include abutment means in the form of teeth 74 formed on one surface of a block 76. The block 76 is rigidly fastened to flat face 38 of the main support member 36 by bolts 78 and projects perpendicularly to the flat face below latch bolt 54. For reasons which will become apparent hereinafter, the teeth 74 are arranged generally in an arc about an axis defined by the rivet 52. Cooperating with the abutment means is an inertially responsive detent lever 80 having an enlarged end 82 with teeth 84 formed thereon. The detent lever 80 is rotatably supported on a rivet 86 rigidly affixed to and projecting generally perpendicularly to the plane of latch bolt 54. The teeth 84 on the detent lever traverse an arc about an axis of the latch bolt 54 defined by the rivet 86 as the detent lever pivots about the latter. The enlarged end 82 concentrates the bulk of the mass of the detent lever 80 generally at the end distant from rivet 86 and dictates a location for the center of gravity 87 of the detent lever generally adjacent the enlarged end thereof so that the detent lever functions essentially as a pendulum swinging about the rivet 86.

As best seen in FIGS. 2 and 3, a control pin 88 rigidly affixed to latch bolt 54 and projecting perpendicularly to the plane thereof intersects the plane of the detent lever 80. The control pin 88 is located on the latch bolt such that in the latching position of the latter the detent lever 80 abuts the control pin 88 and is held thereby at a predetermined angle θ, FIG. 2, from the vertical orientation with the teeth 84 on the detent lever generally overlying in spaced relation the teeth 74 on the fixed block 76. Since the control pin engages the detent lever between the center of gravity 87 of the latter and the end thereof supported on rivet 86, gravity maintains the detent lever in engagement with the control pin as long as the cushion back member remains in the upright position.

When normal conditions prevail, as when a passenger seeking entrance to or exit from the space behind seat structure 10 relatively slowly pivots the cushion back member 22 from the upright position to the tilted position, the cross bar striker 64 and spring 58 initiate relatively slow counterclockwise pivotal movement of the latch bolt 54 from the latching toward the unlatching position. The relatively slow tilting of the cushion back member 22 fails to generate any significant forwardly directed inertia force on the detent lever so that as the latch bolt 54 pivots slowly counterclockwise the detent lever 80 remains in engagement with the control pin 88 and thus moves as a unit with the latch bolt relative to the teeth 74. Of course, counterclockwise pivotal movement of the latch bolt 54 subsequent to the detent lever 80 achieving vertical orientation results in separation between the control pin and the detent lever. Such separation does not occur, however, until after the teeth 84 on the detent lever have cleared the teeth 74 on the fixed block 76 so that the detent lever does not interfere with the continued pivotal movement of the latch bolt 54 to the unlatching position, FIG. 4. Thus under normal conditions the detent lever 80 is inoperative to restrict movement of the latch bolt 54 and the latter merely idles back and forth between the latching and unlatching positions as described hereinbefore.

Under abnormal circumstances, as during an emergency stop, it is desirable to maintain the cushion back member 22 and cushion 24 in the upright position against the inertially motivated tendency thereof to move from the upright to the tilted position. When such conditions prevail an inertia force is generated which acts on the detent lever 80 through the center of gravity 87 thereof and applies a clockwise turning movement thereto about rivet 86. The magnitude of this turning movement is dependent upon the rate at which the vehicle is slowing or the deceleration. If the deceleration is very rapid the turning movement on the detent lever will be sufficient to rotate the latter clockwise, FIG. 2, off of control pin 88 until the teeth 88 on the detent lever engage the teeth 74 on the fixed block 76, this engagement resulting from the fact that in the latching position of the latch bolt the teeth 84 and 74 are situated on intersecting arcs about two different centers. As seen best in FIG. 5, when the teeth 84 and 74 are thus engaged no pivotal movement of the latch bolt relative to the rivet 52 is possible so that the latter forms a rigid link between the cross bar striker 64 and the cushion back member 22 to prevent the aforementioned inertially motivated tilting of the latter from the upright to the tilted position.

The deceleration of the vehicle may, of course, be just sufficient to maintain the detent lever 80 at the angle θ relative to vertical orientation, FIG. 2. In this circumstance the inertially motivated tilting of the cushion back member 22 causes the latch bolt 54 to begin counterclockwise pivotal movement, FIG. 2, resulting in immediate separation between the control pin 88 and the detent lever 80. With the detent lever inertially held at the angle θ, pivotal movement of the latch bolt bodily shifts the detent lever downward until the teeth 84 engage the teeth 74 on the fixed block 76, such engagement preventing further pivotal movement of the latch bolt 54. The inertially motivated tilting of the cushion back member is thus positively arrested after only an insignificant amount of pivotal movement occurs.

It will, of course, be apparent to those skilled in the art that when either of the aforementioned abnormal conditions cease, the detent lever 80, the latch bolt 54 and the cushion back member 22 return under the influence of gravity to their normal position, FIG. 2. The latch according to this invention is, therefore, completely automatic in operation so that no passenger effort is required to latch or unlatch the cushion back member.

Referring now to FIG. 2, it will be further apparent that the sensitivity of the latch 34 is dependent upon a magnitude of angle θ. More particularly, as the angle θ is increased the force exerted on the control pin 88 by the detent lever increases so that a more rapid vehicle deceleration generating a larger inertial force on the detent lever 80 through the center of gravity 87 thereof is required to generate a turning movement sufficient to rotate the detent lever or to maintain the latter at the angle θ. Since a more rapid deceleration of the vehicle is required to cause latching, the latch is necessarily less sensitive. Conversely, by decreasing the angle θ toward zero more sensitivity is achieved because the force exerted by the detent lever on the control pin 88 is reduced, hence reducing the magnitude of the turning movement necessary to rotate the detent lever or to maintain it at the new angle θ. The angle θ may, of course, conveniently be varied merely by altering the location of control pin 88 on the latch bolt 54.

Having thus described the invention what is claimed is:

1. In a vehicle body having a seat structure including a cushion base member and a cushion back member supported on said cushion base member for pivotal movement between a normal upright position and a tilted position angularly spaced from said upright position, a latch comprising, a striker, means rigidly mounting said striker on one of said cushion base member and said cushion back member, a bifurcated latch bolt, means on the other of said cushion base member and said cushion back member defining an axis thereof and supporting said latch bolt thereon for pivotal movement about said axis between a latching position capturing said striker in said upright position of said cushion back member and an unlatching position releasing said striker, abutment means, means fixedly mounting said abutment means on said other of said cushion base member and said cushion back member in an arc about said axis thereof, an inertially responsive detent lever, means on said latch bolt defining an axis thereof and supporting said detent lever thereon for pivotal movement in an arc about said axis, said arc of said detent lever intersecting said arc of said abutment means in said latching position of said latch bolt, and stop means on said latch bolt engageable on said detent lever in said latching position of said latch bolt to maintain said detent lever at a predetermined angle of inclination, said detent lever being normally movable as a unit with said latch bolt and being engageable on said abutment means in response to a change in velocity of said vehicle sufficient to induce inertially motivated tilting of said cushion back member from said upright to said tilted position to prevent movement of said latch bolt from said latching position to said unlatching position and thereby maintain said cushion back member in said upright position, the angle of inclination of said detent lever determining the minimum rate of change of velocity of said vehicle necessary to cause engagement between said detent lever and said abutment means.

2. In a vehicle having a seat structure including a cushion base member and a cushion back member supported on said cushion base member for pivotal movement between a normal upright position and a tilted position angularly spaced from said upright position, a latch comprising, striker means, means mounting said striker means on one of said cushion back member and said cushion base member, a latch bolt, means mounting said latch bolt on the other of said cushion back member and said cushion base member for movement between a latching position capturing said striker means in said upright position of said cushion back member and an unlatching position releasing said striker means, abutment means, means rigidly mounting said abutment means on said other of said cushion back member and said cushion base member, an inertially responsive detent lever, means pivotally supporting said detent lever on said latch bolt, said detent lever normally remaining remote from said abutment means and being engageable thereon in the upright position of said cushion back member in response to a change in the velocity of said vehicle to prevent movement of said latch bolt from said latching to said unlatching position and inertially motivated movement of said cushion back member from said upright to said tilted position, and control means on said latch bolt and on said inertially responsive detent lever operable to vary the minimum rate of change of velocity of said vehicle necessary to effect engagement between said inertially responsive detent lever and said fixed abutment means.

* * * * *